(12) United States Patent
Battyani

(10) Patent No.: US 11,415,710 B2
(45) Date of Patent: Aug. 16, 2022

(54) XRF ANALYZER WITH IMPROVED RESOLUTION BY USING MICRO-RESET

(71) Applicant: OLYMPUS AMERICA INC., Center Valley, PA (US)

(72) Inventor: Marc Battyani, Arlington, MA (US)

(73) Assignee: Olympus America Inc., Center Valley, PA (US)

( * ) Notice: Subject to any disclaimer, the term of this patent is extended or adjusted under 35 U.S.C. 154(b) by 0 days.

(21) Appl. No.: 15/082,647

(22) Filed: Mar. 28, 2016

(65) Prior Publication Data

US 2017/0276803 A1    Sep. 28, 2017

(51) Int. Cl.
| | |
|---|---|
| *G01T 1/17* | (2006.01) |
| *G01T 1/175* | (2006.01) |
| *G01N 23/223* | (2006.01) |
| *G01T 1/36* | (2006.01) |

(52) U.S. Cl.
CPC .......... *G01T 1/175* (2013.01); *G01N 23/223* (2013.01); *G01T 1/17* (2013.01); *G01T 1/366* (2013.01)

(58) Field of Classification Search
CPC ............................... G01T 1/175; G01N 23/223
See application file for complete search history.

(56) References Cited

U.S. PATENT DOCUMENTS 5,430,406 A * 7/1995 Kolodziejczyk .......... G01J 1/44
                                                                    250/369
5,870,051 A * 2/1999 Warburton .......... H03M 1/1295
                                                                    341/143

(Continued)

FOREIGN PATENT DOCUMENTS

| CN | 107238619 A | 10/2017 |
|---|---|---|
| CN | 107238619 B | 7/2020 |

(Continued)

OTHER PUBLICATIONS

Bastia et al. An integrated reset/pulse pile-up rejection circuit for pixel readout ASICs, IEEE Transactions on Nuclear Science, vol. 53, No. 1 (Feb. 2006), pp. 414-417.*

(Continued)

*Primary Examiner* — David P Porta
*Assistant Examiner* — Shun Lee
(74) *Attorney, Agent, or Firm* — Schwegman Lundberg & Woessner, P.A.

(57) ABSTRACT

Disclosed is an electronic system for resetting the voltage of a charge-sensitive pre-amplifier having input from an X-ray detector and output to an ADC. The pre-amplifier gain is increased so that the RMS ADC noise is less than 1% of a representative digitized X-ray signal. The reset logic is configured to avoid loss of X-ray counts and to prevent the pre-amplifier output being outside the allowable input range of the ADC. Reset is initiated when the pre-amplifier output rises above an upper level, which is below the maximum allowable ADC input. Reset is also initiated when a pile-up event is detected, provided that such reset will not cause the pre-amplifier output to fall below the minimum allowable ADC input. At each reset a known amount of charge is removed from the pre-amplifier, and the reset time is continuously adjusted to ensure that the charge amount does not drift.

20 Claims, 8 Drawing Sheets

(56) References Cited

U.S. PATENT DOCUMENTS

| | | | |
|---|---|---|---|
| 5,873,054 A * | 2/1999 | Warburton | G01T 1/171 250/370.06 |
| 2003/0156666 A1 | 8/2003 | Nichols | |
| 2014/0197307 A1 * | 7/2014 | Jorion | G01T 1/17 250/252.1 |

FOREIGN PATENT DOCUMENTS

| | | |
|---|---|---|
| EP | 3226037 A1 | 10/2017 |
| EP | 3226037 B1 | 6/2021 |

OTHER PUBLICATIONS

Baker Matching the noise performance of the operational amplifier to the ADC, Texas Instruments Incorporated SLYT237 (2006), 10 pages.*

Texas Instruments Incorporated ADS8325 data sheet (Aug. 2007), 36 pages.*

"Chinese Application Serial No. 201710051018.8, Office Action dated Sep. 12, 2019", W/English Translation, 17 pgs.

"European Application Serial No. 17161714.5, Response filed Apr. 4, 2018 to Extended European Search Report dated Aug. 4, 2017", 13 pgs.

"European Application Serial No. 17161714.5, Response filed Aug. 7, 2019 to Communication Pursuant to Article 94(3) EPC dated Apr. 15, 2019", 19 pgs.

"Chinese Application Serial No. 201710051018.8, Office Action dated Apr. 18, 2019", w/English Translation, 22 pgs.

"European Application Serial No. 17161714.5, Communication Pursuant to Article 94(3) EPC dated Apr. 15, 2019", 4 pgs.

"European Application Serial No. 17161714.5, Extended European Search Report dated Aug. 4, 2017", 8 pgs.

Alberti, R, et al., "Optimized readout configuration for PIXE spectrometers based on Silicon Drift Detectors: Architecture and performance", Nuclear Instruments & Methods in Physics Research. Section A: Accelerators, Spectrometers, Detectors, and Associated Equipment, Elsevier BV *North-Holland, NL, val. 607, No. 2, (Aug. 11, 2009), 458-462.

Landis, D A, et al., "Transistor Reset Preamplifier for High Rate High Resolution Spectroscopy", IEEE Transactions on Nuclear Science., vol. 29, No. 1, (Jan. 1, 1982), 619-624.

Pullia, A, et al., "Digitized Preamplifiers: A Circuit Structure for Sliding-Scale Optimization of the ADC Range", IEEE Transactions on Nuclear Science, 53 (1), (2006), 247-252.

Zeng, Guoqiang, et al., "Reset Charge Sensitive Amplifier for Nai (TI) Gamma-Rayspectrometer", Applied Radiation and Isotopes, 97, (2015).

"European Application Serial No. 21169753.7, Extended European Search Report dated Aug. 13, 2021", 8 pgs.

* cited by examiner

XRF ANALYZER WITH IMPROVED RESOLUTION BY USING MICRO-RESET

FIELD OF THE INVENTION

The present invention relates to X-ray measurement systems, such as X-ray Fluorescence (XRF) instruments, for detecting X-rays and generating corresponding response electronic signals, and more particularly to the use of charge sensitive pre-amplifiers in which it is necessary to periodically reset the pre-amplifier output voltage.

BACKGROUND OF THE INVENTION

An XRF instrument generally comprises an X-ray source, an X-ray detector and associated electronics. The X-ray detector is usually energy dispersive, with each incident X-ray producing an electronic signal whose charge is proportional to the energy of the X-ray. The detector electronics is designed to amplify each signal so that it becomes large enough to accurately measure the charge corresponding to the X-ray energy. The amplified signals are subsequently digitized and the digital values are used to construct an X-ray spectrum, which is a plot of X-ray energies vs the number of X-rays received with that energy. Such a spectrum exhibits peaks at energies which correspond to the characteristic X-ray energies of elements within the sample being measured. The width of the peaks is a measure of the system's energy resolution and good resolution is a critical parameter enabling identification of the elements in the sample and determination of their concentration.

In X-ray detection systems, signals from the detector are usually pre-amplified with a charge-sensitive pre-amplifier. A charge-sensitive amplifier has the property that its output voltage rises approximately as a step-function in response to input of the charge from an incident X-ray. The output voltage continues to rise to higher and higher voltage levels in response to subsequent X-ray signals, with the height of each voltage step being proportional to the energy of the corresponding X-ray. In systems of existing practice, the output voltage continues to rise until a top voltage threshold is reached and an external reset signal is applied to return the output voltage to zero or a bottom voltage threshold.

In order to determine the energy of each X-ray, the height of the voltage step must be calculated by subtracting the voltage immediately before the step from the voltage immediately after the step. This is most accurately done if the voltage is approximately constant before and after the step.

FIGS. 2A and 2B are illustrative of a typical system of existing practice. FIG. 2A is a schematic of a prior art detection circuit comprising a detector 4', a charge-sensitive pre-amplifier 6', an analog to digital converter (ADC) 10' and a spectrum generator 14'. Detector 4' produces an electrical signal in response to each incident X-ray. An output voltage S-6' of charge-sensitive pre-amplifier 6' rises as each X-ray is received and output voltage S-6' is digitized by ADC 10' to produce an ADC output S-10'. Spectrum generator 14' determines the energy of each X-ray from the digitized step height in output S-10', and constructs a spectrum which is a plot of X-ray energies vs the number of X-rays received with that energy. A comparator 30' compares the output voltage S-6' against a top threshold voltage, which is the highest allowable level of input into ADC 10'. When output voltage S-6' reaches the top threshold voltage, comparator 30' sends a reset signal S-30' to a reset circuit 32' which resets the output voltage S-6' to a bottom threshold voltage, which is the lowest allowable level of input into ADC 10'. In a typical prior art embodiment, the top threshold voltage may be +2V and the bottom threshold voltage may be −2V.

FIG. 2B shows a graph of ADC output S-10' vs time. A top ADC level 35' is the digital equivalent of the top threshold voltage, and a bottom ADC level 34' is the digital equivalent of the bottom threshold voltage. A rising portion 36' of the graph, comprising multiple X-ray signals, begins at bottom ADC level 34' and rises as X-ray signals are received, until the ADC output reaches top ADC level 35'. Typically ADC 10' is a 16 bit ADC, and since ADC output S-10' between bottom ADC level 34' and top ADC level 35' represents the entire range of ADC 10', there will be $2^{16}=65{,}536$ least significant bits (LSBs) within that ADC range. In a typical prior art system, the gain of pre-amplifier 6 is set such that the average step height response to an incident X-ray corresponds to about 100 to 200 LSBs, which means that, typically, about 300-600 incident X-rays will cause the ADC output to rise from bottom ADC level 34' to top ADC level 35'.

It should be noted that the root-mean-square (RMS) noise level from a generally available fast 16-bit ADC is about 3 LSBs. Since the average step in ADC output S-10' due to an incident X-ray is 100 to 200 LSBs, the noise represents several percent of the signal. This has a very significant detrimental effect on the energy resolution available with prior art systems.

Referring again to FIG. 2B, it is seen that when rising portion 36' reaches top ADC level 35', reset signal S-30' causes output voltage S-6' to fall, resulting in a corresponding falling portion 37' of ADC output S-10'. As depicted in FIG. 2B, the duration of falling portion 37', and the corresponding duration of reset signal S-30', is a reset time $t_R'$ whose value is approximately 1 microsecond, which is the relatively long time required for ADC output S-10' to fall over substantially its entire range. For the duration of reset time $t_R'$ output voltage S-6' and ADC output S-10' are insensitive to signals from detector 4', so that any X-rays which are incident during reset time $t_R'$ are not detected. Moreover, at the end of reset time $t_R'$, output voltage S-6' continues to fall below the bottom threshold voltage, creating an undershoot of output voltage S-6' which persists for an undershoot time 39'. For the duration of undershoot time 39', output voltage S-6' is below the lowest acceptable input to ADC 10', and therefore ADC output S-10' has an undershoot value 38' which is equal to bottom ADC level 34', the lowest possible value of ADC output S-10'. During undershoot time 39', ADC 10' is insensitive to signals from detector 4', so that any X-rays which are incident during undershoot time 39' are not detected. It should be noted that in existing systems undershoot time 39' may be 50-100 microseconds, during which time, depending on the count rate, as many as 5-10 X-rays may be incident on the detector, but not detected.

It should also be noted that when rising portion 36' reaches top ADC level 35', reset signal S-30' is applied with no consideration as to whether or not the signal from an incident X-ray is being processed at the time reset signal S-30' is applied. For example, rising portion 36' is very likely to cross the threshold of top ADC level 35' during a step increase of ADC output S-10' caused by an incident X-ray, in which case comparator 30', having no knowledge of the X-ray, applies reset signal S-30' and consequently the X-ray energy cannot be measured.

Comparator 30' also has no knowledge of events in which a second X-ray arrives during the peaking time of a first X-ray. Such events are known as "pile-up" events, and in prior art systems they are managed by employing pulse-shaping techniques to convert the voltage step from the pre-amplifier into a voltage pulse, for example by means of a high-pass filter. Such a voltage pulse will have a fast rise time with an amplitude equal to the original step height, but the pulse will decay with a time constant characteristic of the filter. In order to determine the amplitude, the decaying portion must be extrapolated to zero, and this calculation may become incorrect in the presence of a second pile-up X-ray event. The erroneous amplitude calculation results in an incorrect energy being assigned to the X-ray, with resulting worsening of the spectrum energy resolution.

SUMMARY OF THE INVENTION

Accordingly, it is a general objective of the present disclosure to improve the resolution of an XRF analyzer having a charge sensitive pre-amplifier by resetting the pre-amplifier output voltage more precisely.

It is further an objective of the present disclosure to improve the energy resolution of an X-ray detection system by increasing the amplification of the pre-amplifier so as to increase at least tenfold the number of LSBs in the ADC step height corresponding to each X-ray event.

It is further an objective of the present disclosure to avoid loss of X-ray counts by ensuring that the ADC always remains within its sensitive operating range.

It is further an objective of the present disclosure to eliminate erroneous energy measurements by eliminating pulse-shaping techniques and by correct processing of pile-up events.

The foregoing objectives are achieved by means of a detector reset control circuit comprising a detector, a pre-amplifier, an ADC, a pulse indicator, a micro-reset circuit and a micro-reset decision module.

DETAILED DESCRIPTION OF PREFERRED EMBODIMENTS

Note that in the description below, the term "voltage" is used to designate analog signals, and the term "value" is used to designate digital quantities. Note also that in the description and the drawings a symbol without angle brackets is used to denote an analog quantity, and a symbol with angle brackets is used to denote a digital quantity. For example, the analog value of a charge is Q, and its digitized equivalent is <Q>. In addition, unprimed numerals, such as 6, denote components related to the present disclosure, whereas primed numerals, such as 6', denote components of existing practice. Numerals preceded by "S", such as S-16, denote a signal line.

Figure 1:
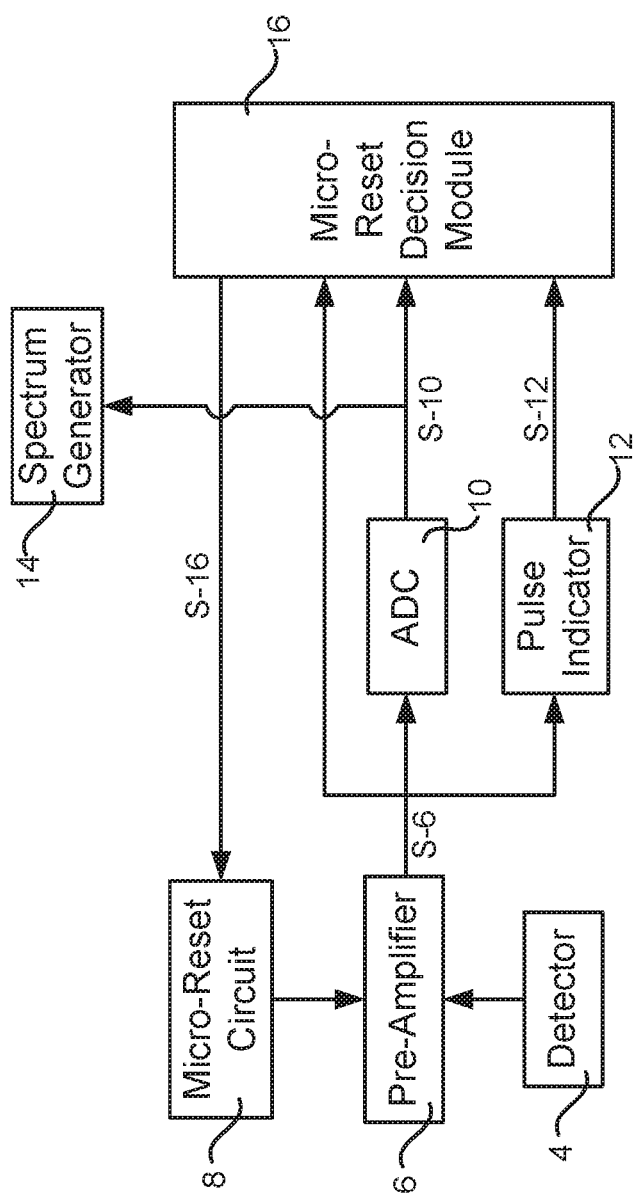
FIG. 1 is a schematic of a detector reset control circuit of an X-ray detection system according to the present disclosure.
Figure 2A:
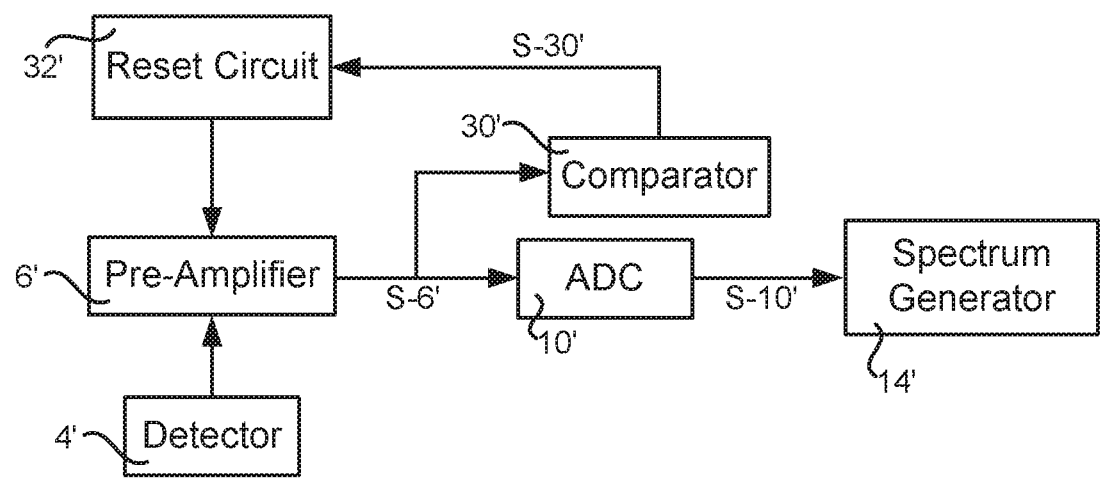
FIG. 2A is a schematic of a prior art X-ray detection system.
Figure 2B:
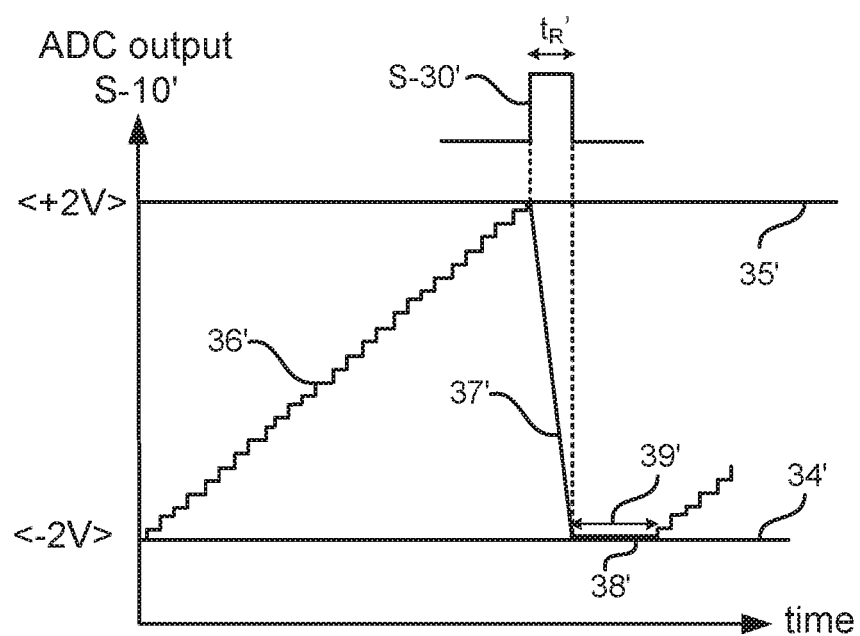
FIG. 2B is a graph of ADC output vs time for a prior art X-ray detection system.

Referring to FIG. 1, a schematic is shown of a detector reset control circuit for an X-ray detection system according to the present disclosure. The detector control circuit preferably comprises a detector 4, a charge-sensitive pre-amplifier 6, an ADC 10, a fast pulse indicator 12, a micro-reset decision module 16 and a micro-reset circuit 8. In operation, pulses from detector 4 are amplified by pre-amplifier 6 to produce an output voltage S-6 which is digitized by ADC 10, producing an ADC output S-10, from which an energy spectrum is generated by a spectrum generator 14. Pulse indicator 12 produces a fast pulse timing signal S-12, providing an indication of an arrival time of an X-ray at detector 4. Micro-reset decision module 16 receives ADC output S-10, output voltage S-6 and timing signal S-12, and, based on a number of reset logic decisions described below, produces a reset signal S-16 which causes micro-reset circuit 8 to reset output voltage S-6, also as described below.

Optionally, and not shown in FIG. 1, the detector reset control circuit may further comprise or connect to a second pre-amplifier which is not a charge sensitive pre-amplifier. Such an arrangement is also within the scope of the present disclosure.

Figure 3A:
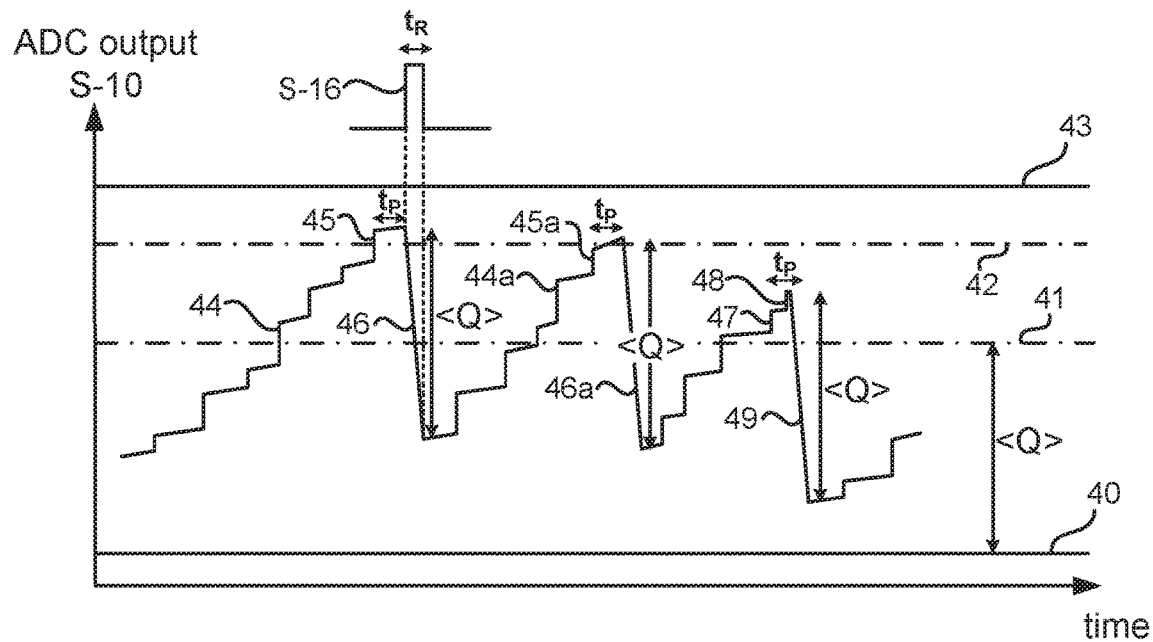
FIG. 3A is a graph of ADC output vs time for an X-ray detection system according to the present disclosure.

Reference is now made to FIG. 3A. which shows a graph of ADC output S-10 vs time. A top ADC level 43 is the digital equivalent of the top threshold voltage, which is the highest output voltage S-6 allowable as input into ADC 10. Top ADC level 43 is therefore the highest possible value of ADC output S-10, which is 65,536 LSBs in the embodiment of a 16 bit ADC. A bottom ADC level 40 is the digital equivalent of the bottom threshold voltage, which is the lowest possible value of ADC output S-10, in which all the ADC bits are zero. A rising portion 44 of the graph, comprising multiple X-ray signals, begins above bottom ADC level 40 and rises as X-ray signals are received. For the embodiment in which ADC 10 is a 16 bit ADC, there are 65,536 LSBs between bottom ADC level 40 and top ADC level 43.

It should be noted that unlike systems in existing practice where the gain of pre-amplifier 6 is set such that the average step height response to an incident X-ray corresponds to about 100 to 200 LSBs, the novel design of the present disclosure enables the gain of pre-amplifier 6 to be set at least ten times higher, and preferably 15 to 30 times higher, so that the average step height response to an incident X-ray corresponds to about 1,500 to 6,000 LSBs. Whereas, in existing systems, typically 300-600 incident X-rays will cause ADC output S-10 to rise sufficiently so that reset is required, in the system of the present disclosure reset occurs on average after only 10-100 incident X-rays.

Note that, in common with existing systems, the RMS noise of ADC 10 is about 3 LSBs RMS (equivalent to about 20 LSBs peak-to-peak noise). However, in the system of the present disclosure the RMS noise typically represents only 0.05%-0.2% of the signal, and is always less than 1% of the signal, compared to existing systems where the ADC RMS noise is several percent of the signal. In existing practice, the contribution from pre-amplifier noise is usually much smaller than the ADC noise. In the system according to the present disclosure, the pre-amplifier gain may be increased until the pre-amplifier noise is equal to or slightly less than the ADC noise.

In XRF systems the characteristic X-ray emission of iron, having an energy of about 6.4 keV, is often used as a calibration standard. In the present system, the gain of pre-amplifier 6 may be set so that the step height response of ADC output S-10 due to an incident iron X-ray corresponds to at least 1,500 LSBs, so that the RMS noise of ADC 10 at about 3 LSBs typically corresponds to 0.2% or less of the iron X-ray signal, and is always less than 1% of the iron X-ray signal.

Increasing the gain of pre-amplifier 6 is an important and novel aspect of the present invention, allowing a significant improvement in energy resolution due to reduction in the relative importance of ADC noise. However, increasing the gain of pre-amplifier 6 means that more frequent resets are required and, therefore, it would be unacceptable to lose X-ray counts at each reset in the same manner as existing systems. Loss of X-rays counts is avoided by a further novel and important aspect of the present invention, which is use of a micro-reset decision module providing a logical framework designed to avoid unnecessary loss of X-ray counts. In this context, "micro-reset" implies that, unlike in existing practice, reset may occur over only a part of the full voltage range of pre-amplifier 6, corresponding to only part of the full bit range of ADC 10.

Referring again to FIG. 3A, an upper ADC level 42 is defined to be below top ADC level 43 by an amount corresponding approximately to the digitized equivalent of the maximum X-ray energy value. In an embodiment, upper level 42 may be about 6,000 LSBs below top level 43. Micro-reset decision module 16 is configured to output reset signal S-16 when rising portion 44 crosses upper level 42. A signal 45 is shown crossing upper level 42 in FIG. 3A. However, yet another significant novel aspect of the reset circuit is that the micro-reset does not occur until a peaking time $t_P$ has elapsed. Peaking time $t_P$ is the time taken to establish a level of ADC output S-10 after signal 45, so that the energy of the corresponding X-ray may be determined by subtraction of the energy before arrival of signal 45 from the energy after arrival of signal 45. If micro-reset occurs before peaking time $t_P$ has elapsed, the X-ray count corresponding to signal 45 would be lost. If another X-ray signal arrives before peaking time $t_P$ has elapsed, a pile-up event would have occurred, and both X-ray counts would be lost. However, in the absence of a pile-up event, signal 45 is counted and its energy measured prior to the micro-reset, and loss of an X-ray count at reset, as occurs in existing practice, is avoided. Note also that, since upper ADC level 42 is below top ADC level 43 by an amount corresponding approximately to the maximum X-ray energy, there is little chance that signal 45 will reach top ADC level 43. Thus, in normal operation, ADC output S-10 does not reach top ADC level 43, thereby avoiding loss of X-ray counts or erroneous energy measurement due to saturation of ADC output S-10 at its maximum value.

After waiting for peaking time $t_P$, micro-reset occurs, as shown by a graph falling portion 46, which lasts for a reset time $t_R$. Reset time $t_R$ has a duration of 20-100 nanoseconds, which is 10 to 50 times shorter than the reset time in existing systems. The duration of reset time $t_R$ is adjusted so that at each micro-reset, a predetermined constant charge amount Q is removed from pre-amplifier 6. A charge reset drop <Q>, the digital equivalent of charge amount Q, is shown in FIG. 3A. Charge reset drop <Q> corresponds to less than the maximum number of LSBs of ADC 10. In an embodiment, where ADC 10 is a 16-bit ADC, charge reset drop <Q> may correspond to 30,000 to 50,000 LSBs. To maintain the constancy of charge reset drop <Q>, reset time $t_R$ is continuously adjusted by a reset time adjustment unit 9 (see FIG. 4), which monitors ADC output S-10 and measures charge reset drop <Q> at each reset event. If a measured actual charge reset drop is less than the desired constant charge reset drop <Q>, then reset time adjustment unit 9 increases the value of reset time $t_R$ and transmits the increased value to micro-reset circuit 8 for use at the next reset event. If a measured actual charge reset drop is greater than the desired constant charge reset drop <Q>, then reset time adjustment unit 9 reduces the value of reset time $t_R$ and transmits the reduced value to micro-reset circuit 8 for use at the next reset event. In this way constancy of charge reset drop <Q> is maintained despite any drift of electronic components which may cause variation of the gain of pre-amplifier 6 and/or ADC 10.

Note that, as illustrated in FIG. 3A, ADC output S-10 does not remain constant between the step increases corresponding to arrival of each X-ray. Even in the absence of an X-ray, ADC output S-10 rises slowly due to leakage of charge in detector 4. Consequently, a rising portion may cross upper ADC level 42 also in absence of an X-ray pulse. This is illustrated by a rising portion 44a, in which a signal 45a does not cross upper ADC level 42 during an X-ray pulse, but subsequently crosses upper ADC level 42 due to leakage. In this case, as before, in order to ensure that the energy of signal 45a is correctly measured, micro-reset decision module 16 waits until peaking time $t_P$ has elapsed since arrival of signal 45a, and then triggers a micro-reset represented by falling portion 46a.

A lower ADC level 41 is defined as being above bottom ADC level 40 by the amount of charge reset drop <Q>. Falling portions 46 and 46a result in ADC output S-10 being below lower ADC level 41, but above bottom ADC level 40. Micro-reset in the present system never allows ADC output S-10 to fall to bottom ADC level 40, and therefore there is no dead time after reset due to pre-amplifier output voltage S-6 being out of range. Moreover, because the reset occurs over a small part of the full output range of pre-amplifier 6, there is much less undershoot than in existing systems, and the recovery time is much shorter. On average, undershoot recovery occurs in a time equivalent to one or two times peaking time $t_P$, and consequently the total dead time after reset is very small.

The reset condition in which micro-reset decision module 16 performs a reset when ADC output S-10 exceeds upper ADC level 42 is referred to herein as an "upper level reset", and the associated logic is further described below in connection with FIG. 6. However, there are other conditions in which micro-reset decision module 16 may perform a reset. As another novel aspect of the present disclosure, reset may also occur if a pile-up event is detected, provided that ADC output S-10 is above lower ADC level 41 at the time the pile-up event occurs. Such a reset is referred to herein as a "pile-up reset", and the associated logic is further described below in connection with FIGS. 5 and 7.

FIG. 3A illustrates a pile-up event in which a second signal 48 arrives in a time less than peaking time $t_P$ after arrival of a first signal 47. In this situation, the information from both first signal 47 and second signal 48 is lost because the step height of neither signal can be measured. It is therefore advantageous to utilize the peaking time $t_P$ after arrival of second signal 48 to perform an immediate pile-up reset as soon as second signal 48 is detected. The result of the reset is a falling portion 49 of the graph, and as before the magnitude of the fall is equal to charge reset drop <Q>. Note that pile-up reset may only occur if ADC output S-10 is above lower ADC level 41, because if reset were triggered when ADC output S-10 is below lower ADC level 41 the reset would attempt to drive ADC output S-10 below bottom ADC level 40, corresponding to pre-amplifier signal S-6 below its bottom threshold voltage. This is an undesirable situation which would result in increased dead time and consequent loss of X-ray counts.

Falling portions 46, 46*a* and 49 have the same duration, which is reset time $t_R$, and each results in a reduction of ADC output S-10 by an amount <Q>. However, if an X-ray signal corresponding to an X-ray with energy E arrives during reset time $t_R$, then the reduction of ADC output S-10 would be equal to $$<Q_X> = <Q> - <E> \quad (1)$$

where $<Q_X>$ is the measured reduction of ADC output S-10 when an X-ray arrives during the reset, and <E> is the digital representation of X-ray energy E. Thus, because the reduction of ADC output S-10 due to each micro-reset is known and equal to <Q>, X-rays arriving during the reset time are not lost. Their energy may be determined from the relationship $$<E> = <Q> - <Q_X> \quad (2)$$

and such X-ray energies may be added to the X-ray spectrum.

Figure 3B:
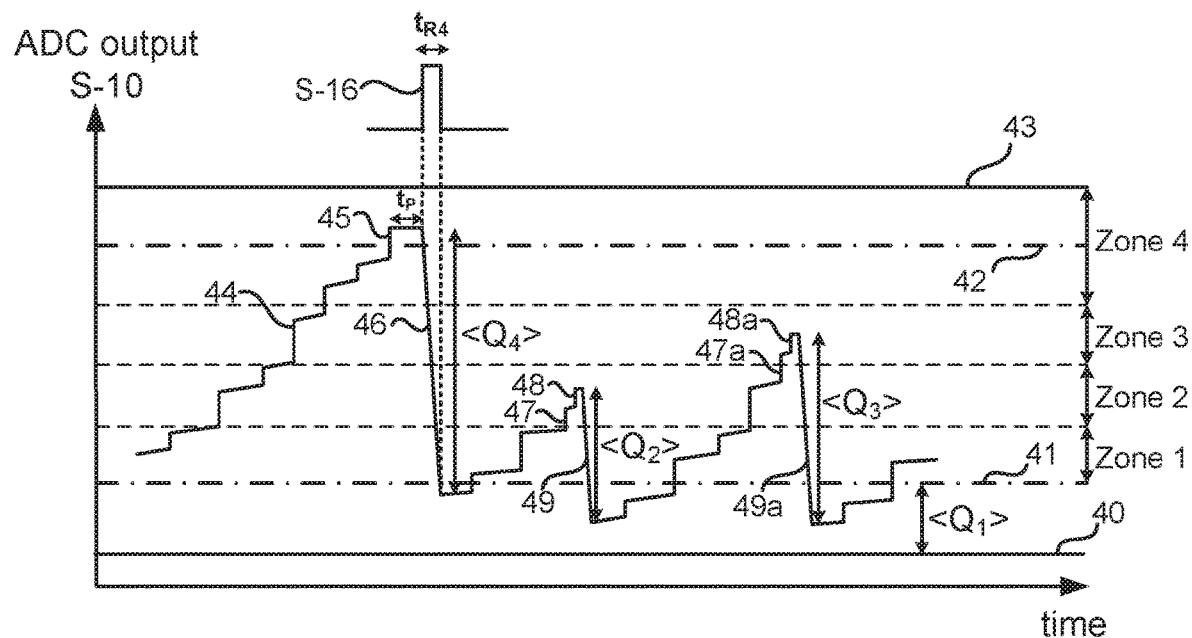
FIG. 3B is a graph of an alternative embodiment of ADC output vs time for an X-ray detection system according to the present disclosure.

As shown in FIG. 3A, charge reset drop <Q> is configured to be constant for all micro-resets, such as those depicted by falling portions 46, 46*a* and 49. However, in a further and novel embodiment of the invention, as illustrated in FIG. 3B, charge reset drops may be different depending on the level of ADC output S-10 at the time of the micro-reset. Basically, a larger charge reset drop is possible during reset when ADC output S-10 is near the top of its range than when it is near the bottom of its range. Many different algorithms for calculating the dependence of charge reset drop on ADC output S-10 may be devised by those skilled in the art, and all are within the scope of the present disclosure. The requirements of any such algorithm are that the charge reset drop should be a known and increasing function of ADC output S-10 at the time the micro-reset is initiated. The advantage of such an algorithm is that the number of available LSBs between lower ADC level 41 and upper ADC level 42 is increased, as can be seen by comparing FIGS. 3A and 3B.

FIG. 3B illustrates a particular embodiment of a charge reset drop algorithm in which lower ADC level 41 is above bottom ADC level 40 by the amount of a charge reset drop $<Q_1>$, and the values of ADC output S-10 between lower ADC level 41 and upper ADC level 42 are divided into 4 zones, namely zone 1, zone 2, zone 3 and zone 4, where zones 1, 2 and 3 each cover one of the lowest three quarters, and zone 4 includes the uppermost quarter and the region between upper ADC level 42 and top ADC level 43. There are four corresponding values of charge reset drop during a micro-reset, namely $<Q_1>$, $<Q_2>$, $<Q_3>$ and $<Q_4>$, and four corresponding reset times $t_{R1}$, $t_{R2}$, $t_{R3}$ and $t_{R4}$ (only $t_{R4}$ is shown) which are implemented by reset time adjustment unit 9 (see FIG. 4). A particular embodiment of a charge reset drop algorithm is a linear dependency on the zone:

$$<Q_i> = <Q_1>(1+k(i-1)) \quad (3)$$

where $<Q_i>$ is the charge reset drop when ADC output S-10 is within zone i, and k is a constant.

As shown in FIG. 3B, for the case of an upper level reset, where rising portion 44 crosses upper ADC level 42, the maximum charge reset drop $<Q_4>$ is applied in the micro-reset. For the case of a pile-up reset due to pile-up between a first signal 47 and a second signal 48 occurring within zone 2, a smaller charge reset drop $<Q_2>$ is applied. For the case of a pile-up reset due to pile-up between a first signal 47*a* and a second signal 48*a* occurring within zone 3, a charge reset drop $<Q_3>$ is applied, resulting in a falling portion 49*a* of ADC output S-10.

It should be noted that division into four zones as shown in FIG. 3B is a representative embodiment only. Any number of zones may be used, and all are within the scope of the present disclosure. Similarly, the use of a linear relationship as in equation (3) is a representative embodiment only. Any relationship in which the charge reset drop is an increasing function of ADC output S-10 may be employed and all such relationships are within the scope of the present disclosure.

Figure 4:
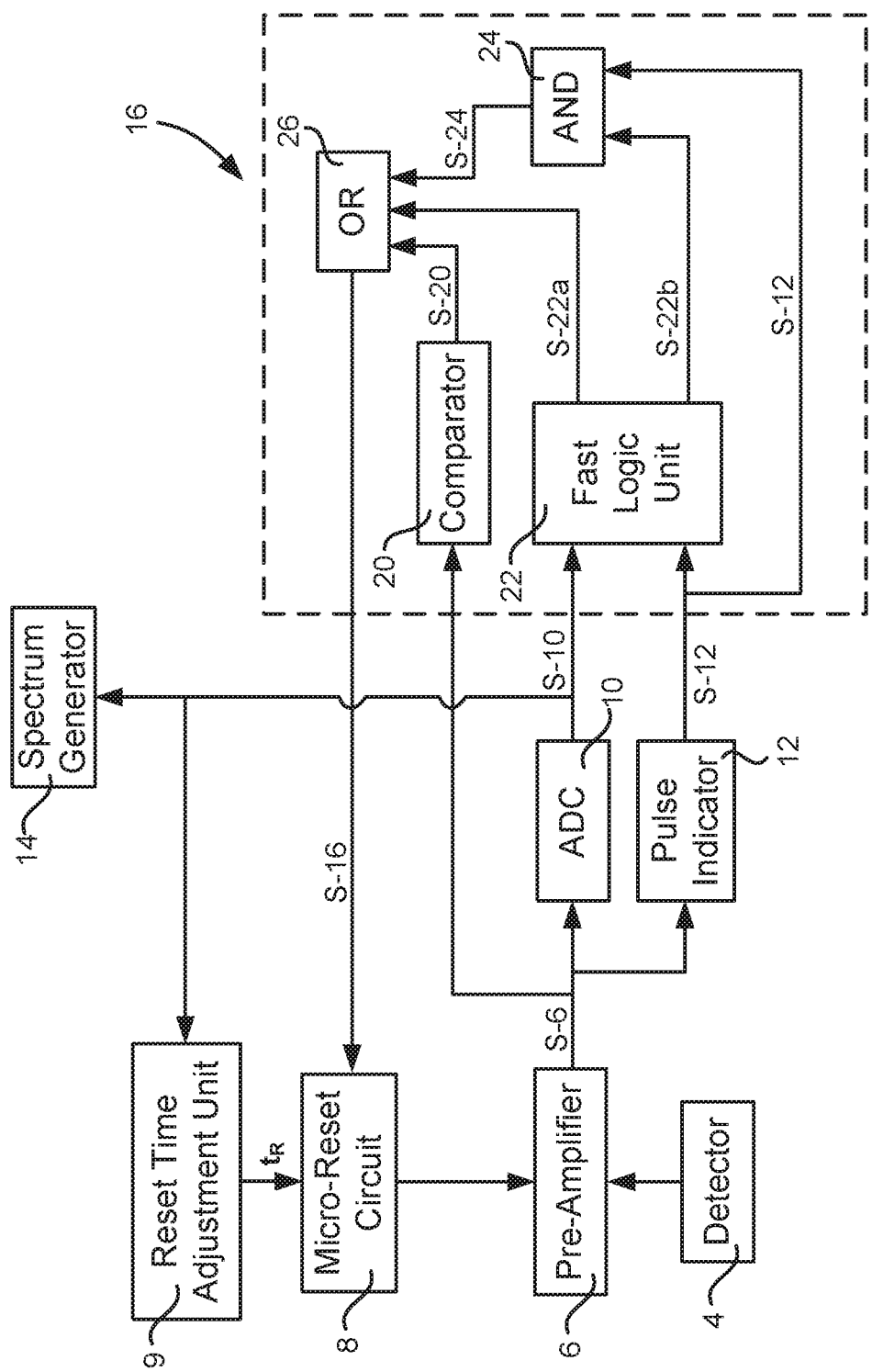
FIG. 4. is a schematic of the detector reset control circuit of the X-ray detection system according to the present disclosure, showing details of the micro-reset decision module.

Referring now to FIG. 4, the same detector reset control circuit depicted in FIG. 1 is shown, but with addition of reset time adjustment unit 9, and including details of an embodiment of micro-reset decision module 16. It should be appreciated that micro-reset decision module 16 as shown in FIG. 4 is an exemplary embodiment only, and other embodiments are all within the scope of the present disclosure. As shown in FIG. 4, micro-reset decision module 16 comprises a fast logic unit 22, an optional comparator 20, an AND gate 24 and an OR gate 26. Fast logic unit 22 is an electronic device capable of making fast logic decisions as described below. Fast logic unit 22 may be a programmable logic device such as a Field-Programmable Gate Array (FPGA), a custom logic device such as an Application-Specific Integrated Circuit (ASIC), or any other kind of digital processor. In addition, it should be noted that fast logic unit 22 may physically reside on a common FPGA or other logic unit handling other general logic processing tasks required by the XRF system. Alternatively, fast logic unit 22 may reside on a separate processor chip. It should be appreciated that all these variations are within the scope of the present disclosure.

Fast logic unit 22 receives input from ADC output S-10 and pulse timing signal S-12, and produces more than one, such as two logical output signals as shown, namely an upper level reset signal S-22*a* and a pile-up reset enable signal S-22*b*. AND gate 24 receives inputs from pulse timing signal S-12 and pile-up reset enable signal S-22*b*, and produces a pile-up reset signal S-24 only if both input signals are present. OR gate 26 receives inputs from upper level reset signal S-22*a* and pile-up reset signal S-24, and produces reset signal S-16 if any one of the two input signals is present. Reset signal S-16 instructs micro-reset circuit 8 to reset output voltage S-6.

Optionally, in the event that fast logic unit 22 is disabled or otherwise unavailable, such as during initial manufacturer testing of detector 4 and pre-amplifier 6, a comparator 20 is available to perform a reset if required. This is referred to herein as a "backup reset" and the details of its usage are described in connection with FIG. 8. Comparator 20 receives input from output voltage S-6, and produces a backup reset signal S-20 when output voltage S-6 reaches the top threshold voltage, which is equivalent to ADC output S-10 reaching top ADC level 43 (see FIG. 3A). In the case when optional comparator 20 is present, OR gate 26 receives inputs from backup reset signal S-20, upper level reset signal S-22*a* and pile-up reset signal S-24, and produces reset signal S-16 if any one of the three input signals is present.

FIG. 4 also shows optional reset time adjustment unit 9, receiving input from ADC output S-10 and producing reset time $t_R$, whose value is input to micro-reset circuit 8. The function and purpose of reset time adjustment unit 9 has been described above in connection with FIG. 3A.

Figure 5:
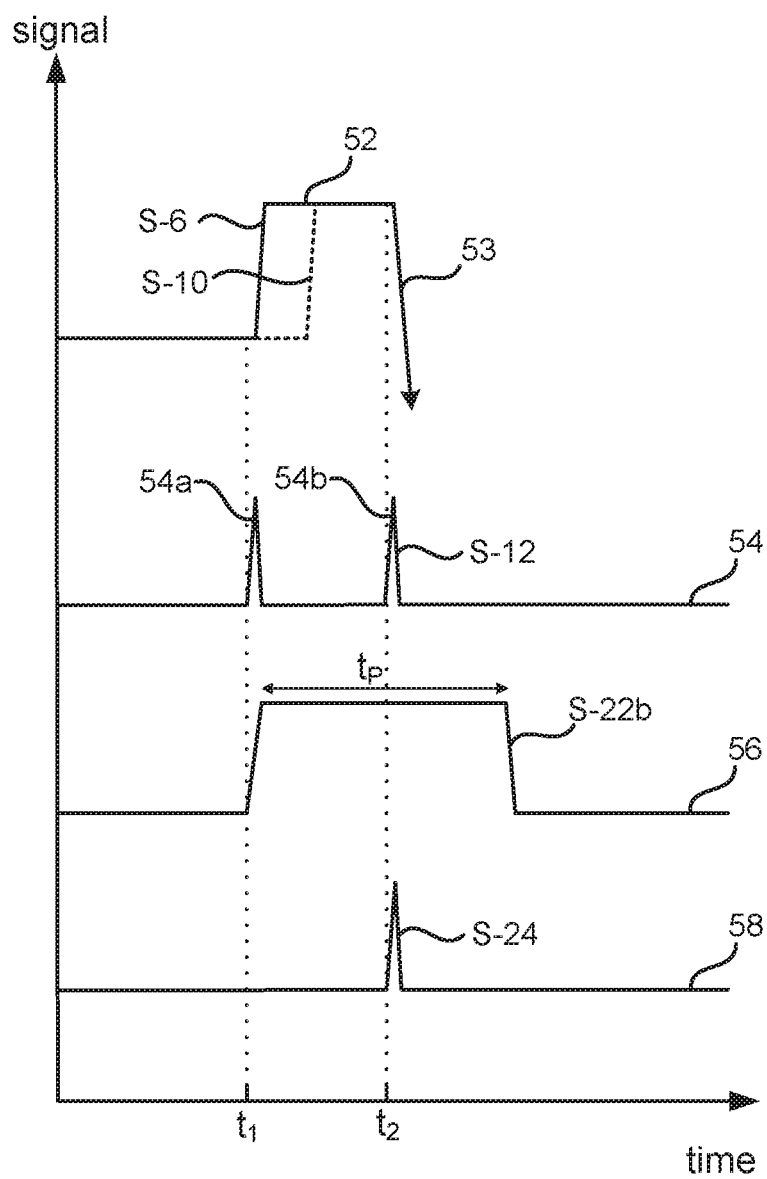
FIG. 5 is a graph of signals for pile-up micro-reset according to the present disclosure.

FIG. 5 shows graphs of signals which enable micro-reset decision module 16 to rapidly detect a pile-up event. FIG. 5 should be referred to in conjunction with FIG. 4. In FIG. 5, a graph 52 plots output voltage S-6 and ADC output S-10 vs time, a graph 54 plots pulse timing signal S-12 vs time, a graph 56 plots pile-up reset enable signal S-22b vs time, and a graph 58 plots pile-up reset signal S-24 vs time. Pulse timing signal S-12 in graph 54 shows arrival of a first pulse 54a at time $t_1$ and arrival of a second pulse 54b at time $t_2$. In graph 52, pre-amplifier signal S-6 responds in very short time to arrival of first pulse 54a, but the response of ADC output S-10 is slower. Pulse timing signal S-12 is input directly to fast logic unit 22 within reset decision module 16. Upon detecting arrival of first pulse 54a, fast logic unit 22 outputs reset enable signal S-22b, which remains high (enabled) for peaking time $t_P$ as shown in graph 56. Second pulse 54b arrives before peaking time $t_P$ has elapsed after arrival of first pulse 54a. Consequently both pulse timing signal S-12 and reset enable signal S-22b are high when pulse 54b arrives, thereby causing AND gate 24 (see FIG. 4) to output pile-up reset signal S-24 as shown in graph 58. Pile-up reset signal S-24 is transmitted by OR gate 26 as reset signal S-16, which causes micro-reset circuit 8 to reset pre-amplifier 6. The reset of pre-amplifier output voltage S-6 is shown in graph 52 by a downward arrow 53.

Figure 6:
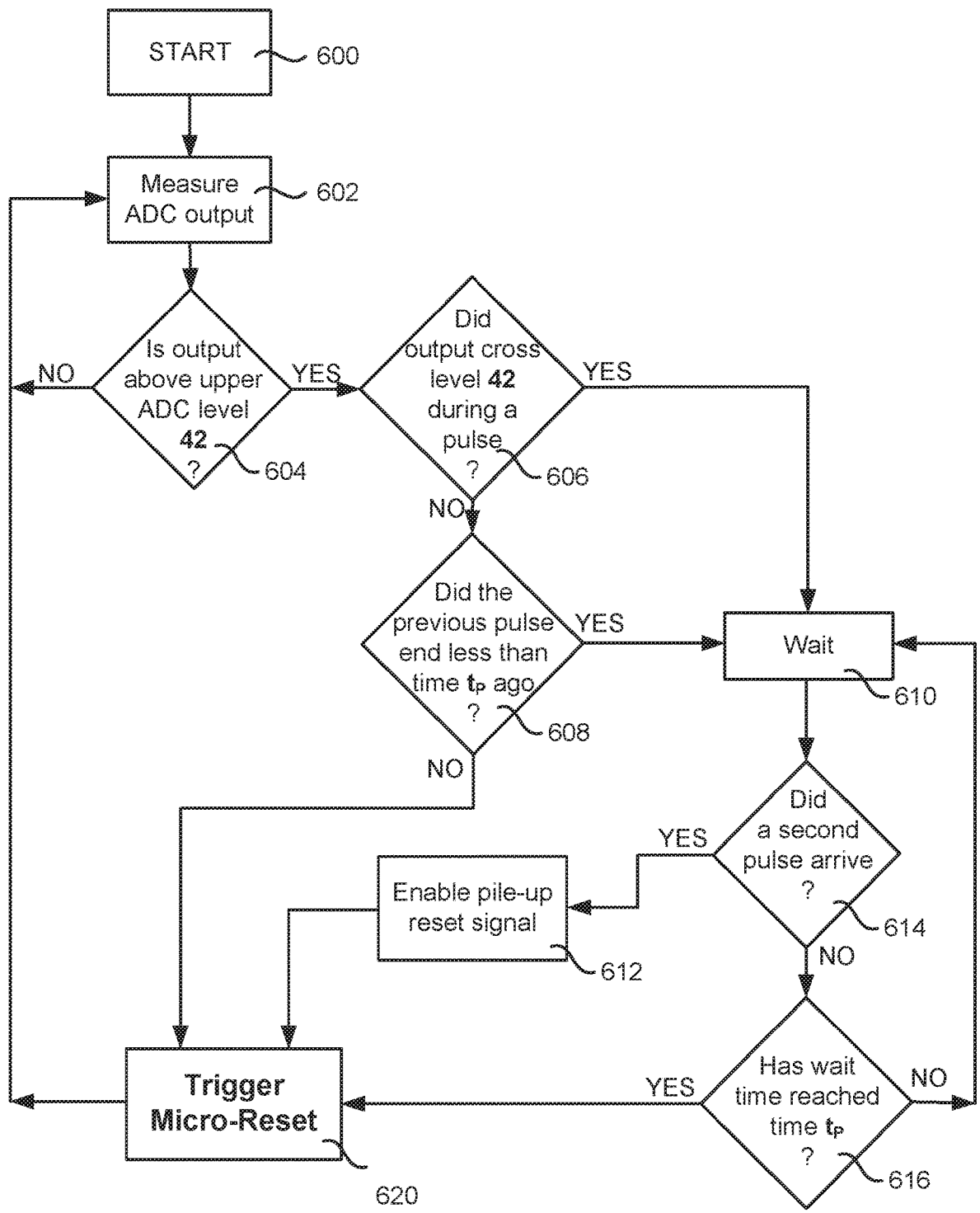
FIG. 6 is a flow chart of upper level reset logic according to the present disclosure.

FIG. 6 is a flow chart of an upper level reset logic process as implemented by fast logic unit 22. The flow chart should be referred to in conjunction with FIGS. 4 and 3A. The process starts at step 600, and at step 602 a measurement is made of ADC output S-10. Step 604 tests whether or not ADC output S-10 is above upper ADC level 42, and if not the process loops back to step 602 and continues to measure ADC output S-10. If the test at step 604 determines that ADC output S-10 is above upper ADC level 42, the process continues to step 606 which tests whether or not the crossing occurred during a pulse caused by an incident X-ray. If not, step 608 tests whether or not the most recent pulse ended less than peaking time $t_P$ ago, and if not, a micro-reset is triggered at step 620 by sending upper level reset signal S-22a via OR gate 26 to micro-reset circuit 8. After the micro-reset at step 620 the process loops back to measuring ADC output S-10 at step 602.

If, at step 606, it is determined that ADC output S-10 crossed upper ADC level 42 during a pulse caused by an incident X-ray, then in order to properly measure the energy of that pulse it is necessary to wait until peaking time $t_P$ has elapsed. Waiting commences at step 610, and fast logic unit 22 at step 614 checks pulse timing signal S-12 throughout the wait time to determine whether or not a second pulse arrives. If not, and if at step 616 the wait time since the last pulse has reached peaking time $t_P$, then a micro-reset is triggered at step 620 by sending upper level reset signal S-22a via OR gate 26 to micro-reset circuit 8. After the micro-reset at step 620 the process loops back to measuring ADC output S-10 at step 602.

Similarly, if at step 608 it is determined that the most recent pulse ended less than peaking time $t_P$ ago, in order to properly measure the energy of that pulse it is necessary to wait until peaking time $t_P$ has elapsed. As before, waiting commences at step 610, and fast logic unit 22 at step 614 checks pulse timing signal S-12 throughout the wait time to determine whether or not a second pulse arrives. If not, and if at step 616 the wait time since the last pulse has reached peaking time $t_P$, then a micro-reset is triggered at step 620 by sending upper level reset signal S-22a via OR gate 26 to micro-reset circuit 8. After the micro-reset at step 620 the process loops back to measuring ADC output S-10 at step 602.

If at step 614 it is determined that a second pulse arrives before the wait for peaking time $t_P$ after arrival of the first pulse has elapsed, then a pile-up event has occurred prior to the upper level reset. Since pile-up reset enable signal S-22b will be high since arrival of the first pulse (see FIG. 5), and pulse timing signal S-12 will be high upon arrival of the second pulse, micro-reset is triggered at step 620 by AND gate 24 sending pile-up reset signal S-24 via OR gate 26 to micro-reset circuit 8. After the micro-reset at step 620 the process loops back to measuring ADC output S-10 at step 602.

It should be noted that the upper level reset logic depicted in FIG. 6 and implemented by micro-reset module 16 is an important and novel aspect of the present disclosure.

Figure 7:
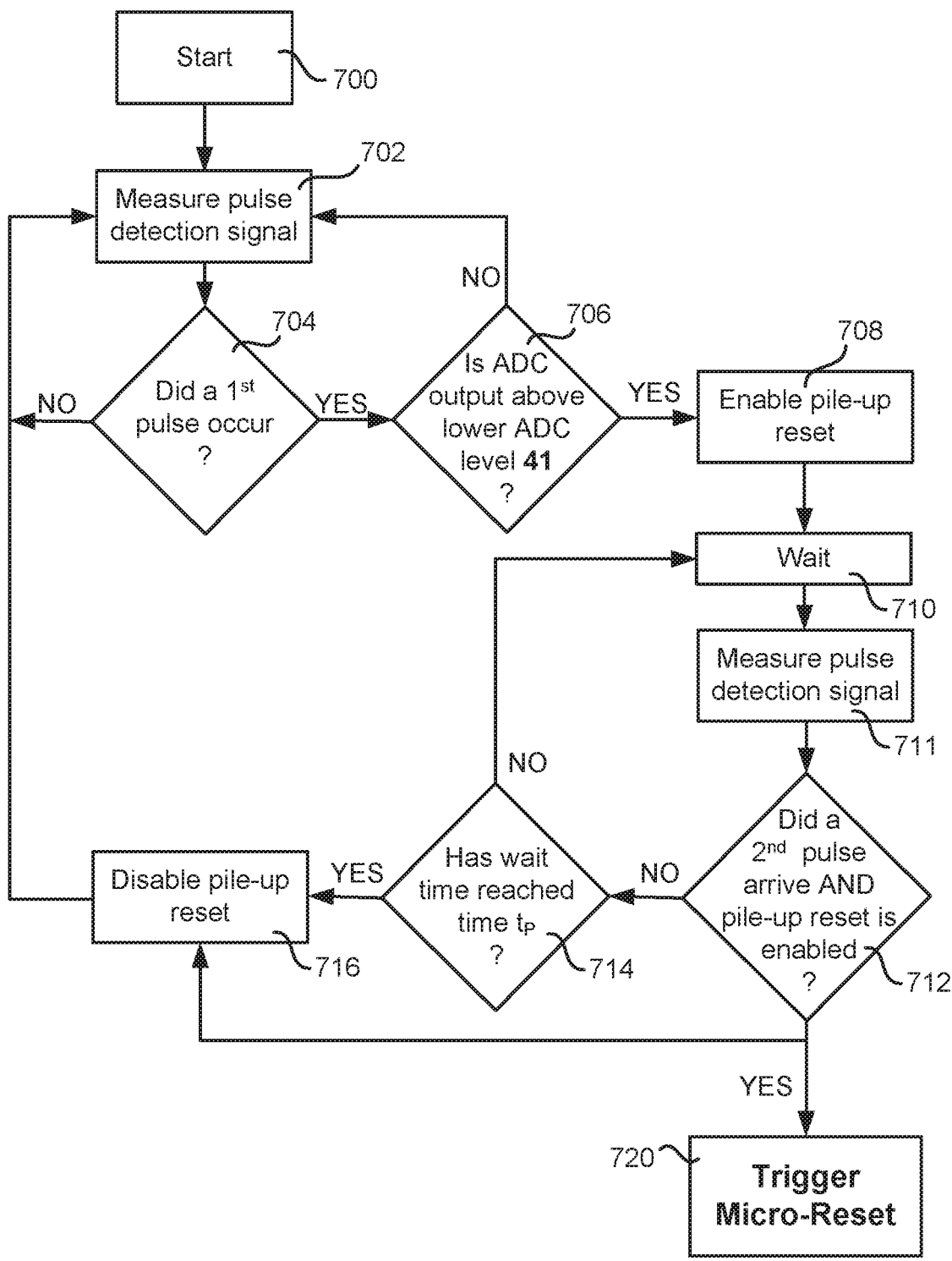
FIG. 7 is a flow chart of pile-up reset logic according to the present disclosure.

FIG. 7 is a flow chart of a pile-up reset logic process as implemented by fast logic unit 22. The flow chart should be referred to in conjunction with FIGS. 4 and 3A. The process starts at step 700, and at step 702 a measurement is made of pulse timing signal S-12. Step 704 determines whether or not a first pulse has occurred. If not, the process returns to measuring pulse timing signal S-12 at step 702. If a pulse is detected at step 704, then step 706 determines whether or not ADC output S-10 is above lower ADC level 41. If not, then pile-up reset may not occur and the process returns to measuring pulse timing signal S-12 at step 702. However, if ADC output S-10 is above lower ADC level 41, then at step 708 fast logic unit 22 outputs pile-up reset enable signal S-22b. The system now enters a waiting state at step 710, and commences measuring pulse timing signal S-12 at step 711. Step 712 represents the function of AND gate 24, namely if pulse timing signal S-12 indicates that a second pulse has arrived and pile-up reset enable signal S-22b is enabled, then micro-reset is triggered at step 720 by AND gate 24 sending pile-up reset signal S-24 via OR gate 26 to micro-reset circuit 8. At the same time that micro-reset is triggered, pile-up enable signal S-22b is disabled at step 716 and the process returns to measuring pulse timing signal S-12 at step 702.

If, at step 712, pulse timing signal S-12 does not indicate that a second pulse has arrived, then at step 714 it is determined whether or not the wait time since the first pulse has reached peaking time $t_P$. If not, waiting continues at step 710. If peaking time $t_P$ has elapsed, then no pile-up event has occurred, pile-up enable signal S-22b is disabled at step 716 and the process returns to measuring pulse timing signal S-12 at step 702.

It should be noted that the pile-up reset logic depicted in FIG. 7 and implemented by micro-reset module 16 is an important and novel aspect of the present disclosure.

Figure 8:
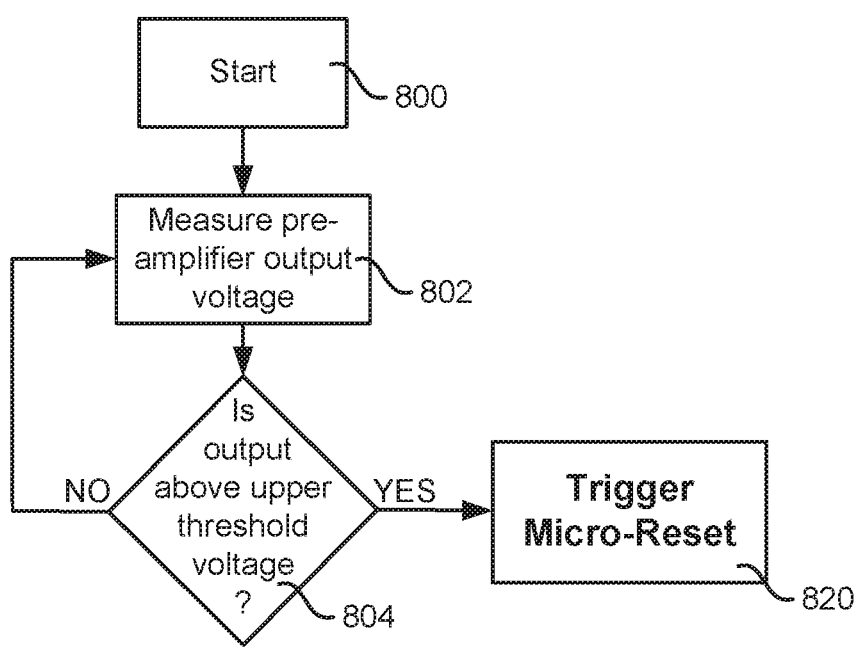
FIG. 8 is a flow chart of backup reset logic according to the present disclosure.

FIG. 8 is a flow chart of a backup reset logic process as implemented by fast logic unit 22. The flow chart should be referred to in conjunction with FIGS. 4 and 3A. As described previously, backup reset logic is available in the event that fast logic unit 22 is disabled or otherwise unavailable, such as during initial manufacturer testing of detector 4 and pre-amplifier 6. The process starts at step 800 and, at step 802, comparator 20 makes a hardware comparison between pre-amplifier output voltage S-6 and the top threshold voltage of pre-amplifier 6. In step 804 it is determined whether or not output voltage S-6 is above its top threshold voltage. It is to be understood that the top threshold voltage is the maximum possible voltage input to ADC 10, and corresponds to the voltage at which ADC output S-6 is equal to top ADC level 43. If output voltage S-6 is not above its top threshold, measurement of output voltage S-6 continues at step 802. If at step 804 it is determined that output voltage S-6 is above its top threshold, then micro-reset is triggered at step 820 by comparator 20 sending backup reset signal S-20 via OR gate 26 to micro-reset circuit 8.

Although the present invention has been described in relation to particular embodiments thereof, it can be appreciated that various designs can be conceived based on the teachings of the present disclosure, and all are within the scope of the present disclosure.

What is claimed is:

1. An X-ray detector reset control circuit used in an X-ray analytical instrument, the instrument is configured to induce and analyze a series of events of induced X-rays, the circuit comprises:
    an X-ray detector configured to detect the events of induced X-rays with energy E ke V and send detector analog voltage response signals indicative of the events of X-rays,
    a charge-sensitive preamplifier connected to the detector and configured to amplify the response signals and produce amplified signals,
    an analog-to-digital converter (ADC) for providing a digitization of the amplified signals, the ADC having an ADC output level and producing a series of digitized signal values corresponding to the events of X-rays, the series of signal values causing a stair-like increase of the ADC output level,
    a pulse indicator producing a fast pulse timing signal indicative of each of the events of X-rays, and
    a micro-reset decision module and a micro-reset unit, wherein the decision module is configured to receive signals from the ADC and trigger a reset by the micro-reset unit to decrease the ADC output level with a charge reset drop, wherein the micro-reset decision module further comprises:
        a fast logic unit receiving the ADC output level and the fast pulse timing signal as input and producing an upper level reset signal and a pile-up reset enable signal as output;
        an AND-gate receiving the pile-up reset enable signal and the fast pulse timing signal as input and producing a pile-up reset signal as output; and,
        an OR-gate receiving the upper level reset signal and the pile-up reset signal as input and producing a reset signal, wherein the reset signal triggers the reset by the micro-reset unit.

2. The X-ray detector reset control circuit of claim 1 is connected to a spectrum generator receiving the series of digitized signal values from the ADC.

3. The X-ray detector reset control circuit of claim 1, wherein the micro-reset decision module establishes the ADC output level a time span after the corresponding fast pulse timing signal, according to a predetermined peaking time $t_p$.

4. The X-ray detector reset control circuit of claim 3, wherein:
    a) an upper level reset criterion includes the ADC output level surpassing an upper level threshold and the peaking time $t_p$ elapsing since a most recent of the fast pulse timing signals; and
    b) a pile-up reset criterion includes the corresponding fast pulse timing signals of two of the events of X-rays being within the peaking time $t_p$.

5. The X-ray detector reset control circuit of claim 3, wherein the decision module triggers the reset after the ADC output level has surpassed an upper level threshold and the peaking time $t_p$ has elapsed since a most recent of the fast pulse timing signals.

6. The X-ray detector reset control circuit of claim 3, wherein the decision module triggers the reset when a pile-up event indicative of more than one fast pulse timing signal occurs within the peaking time $t_p$.

7. The X-ray detector reset control circuit of claim 3, wherein the decision module is configured to execute a process which comprises the steps of:
    a) receiving the signal values with the corresponding fast pulse timing signals,
    b) waiting until the ADC output level has surpassed an upper level threshold,
    c) waiting until the peaking time $t_p$ has elapsed since a most recent of the fast pulse timing signals, and
    d) triggering a reset.

8. The X-ray detector reset control circuit of claim 3, wherein the decision module is configured to execute a process which comprises the steps of:
    a) receiving a first of the signal values with a first of the corresponding pulse timing signals,
    b) determining whether a second of the signal values with a second of the corresponding pulse timing signals is received before the peaking time $t_p$ has elapsed since the first of the pulse timing signals,
    c) determining whether the ADC output level is above a lower level threshold, and
    d) triggering a reset if b) and c) are true.

9. The X-ray detector reset control circuit of claim 1, wherein the decision module further includes a lower level threshold, and is configured to ignore the reset decision when the ADC output level is lower than the lower level threshold.

10. The X-ray detector reset control circuit of claim 1, wherein the charge reset drop is a variable value depending on the value of the ADC output level.

11. The X-ray detector reset control circuit of claim 1, wherein the charge reset drop is a predetermined reset drop determined by the reset time $t_R$ which is an input to the micro-reset unit.

12. The X-ray detector reset control circuit of claim 11 further comprises a reset time adjustment unit which receives digitized signal values from the ADC indicative of an actual charge reset drop for each reset, the reset time adjustment unit further is configured to provide an adjusted reset time to replace the reset time tR in order to increase or decrease the actual charge reset drop during the reset to be substantially equal to the predetermined charge reset drop.

13. The X-ray detector reset control circuit of claim 1, wherein the micro-reset decision module further comprises a comparator receiving the amplified signals as input and producing a backup reset signal when the amplified signals reach a maximum amplified signal level, and wherein the backup reset signal is input to the OR-gate.

14. The X -ray detector reset control circuit of claim 1, wherein the preamplifier has a preamplifier root-mean-square (RMS) noise, the ADC has an ADC RMS noise, and wherein the amplification gain is set so that the preamplifier RMS noise is substantially equal to the ADC RMS noise.

15. The X-ray detector reset control circuit of claim 14, wherein the ADC RMS noise is less than 1% of the ADC output level increase.

16. The X-ray detector reset control circuit of claim 1, further comprising a regular preamplifier coupled with the charge sensitive preamplifier, further amplifying the amplified signals.

17. The X-ray detector reset control circuit of 1, wherein the decision module includes at least one logic unit which is a field programmable gate array.

18. The X-ray detector reset control circuit of 1, wherein the decision module includes at least one logic unit which is an application specific integrated circuit (ASIC).

19. The X-ray detector reset control circuit of claim 1, wherein the ADC is a 16-bit ADC having 65,536 least significant bits (LSBs) in the ADC output range, and incidence of an iron X-ray having E=6.4 keV causes an increase in the ADC output level which is greater than 1,500 LSBs.

20. The X-ray detector reset control circuit of claim 1, wherein the ADC is a 16-bit ADC having 65,536 least significant bits (LSBs) in the ADC output range, and wherein the ADC output level increase divided by E is greater than 234 LSBs.

\* \* \* \* \*

UNITED STATES PATENT AND TRADEMARK OFFICE
CERTIFICATE OF CORRECTION

PATENT NO. : 11,415,710 B2
APPLICATION NO. : 15/082647
DATED : August 16, 2022
INVENTOR(S) : Marc Battyani It is certified that error appears in the above-identified patent and that said Letters Patent is hereby corrected as shown below:

On the Title Page

On page 2, in Column 2, item [56], Line 23, delete "Gamma-Rayspectrometer"," and insert --Gamma-Ray Spectrometer",-- therefor In the Claims Column 11, Line 57, in Claim 3, delete "signal," and insert --signal-- therefor Column 12, Line 51, in Claim 12, delete "tR" and insert --$t_R$-- therefor Column 12, Line 60, in Claim 14, delete "X -ray" and insert --X-ray-- therefor Column 13, Line 5, in Claim 17, after "of", insert --claim--

Column 13, Line 8, in Claim 18, after "of", insert --claim--

Signed and Sealed this
Thirtieth Day of May, 2023

Katherine Kelly Vidal
*Director of the United States Patent and Trademark Office*